United States Patent [19]

Morris

[11] 4,027,357
[45] June 7, 1977

[54] COLLAPSIBLE DRESSING HOOK FOR ANIMALS

[75] Inventor: Florin V. Morris, Taft, Calif.

[73] Assignee: Howard E. Caywood, Taft, Calif. ; a part interest

[22] Filed: Jan. 19, 1976

[21] Appl. No.: 650,506

[52] U.S. Cl. .................................. 17/44; 294/79
[51] Int. Cl.² .................. A22B 1/00; A22C 15/00
[58] Field of Search ........... 17/44, 44.2, 44.3, 1 R; 294/79

[56] References Cited
UNITED STATES PATENTS

| 892,719 | 7/1908 | Gratton | 17/44 |
| 1,033,223 | 7/1912 | Wilson | 17/44 |
| 1,117,436 | 11/1914 | Person | 294/79 |
| 1,174,786 | 3/1916 | Wieland | 294/79 |

FOREIGN PATENTS OR APPLICATIONS 688,432 3/1953 United Kingdom ................ 294/79

Primary Examiner—Louis G. Mancene
Assistant Examiner—Robert P. Swiatek
Attorney, Agent, or Firm—Huebner & Worrel

[57] ABSTRACT

A dressing hook for animals having a yoke adapted to be supported from above and having a pair of oppositely, outwardly extending arms adapted to be hingedly moved on the yoke from the outwardly extending position to a collapsed position; the arms are supported in the outstanding extended position by respective arm supports secured to the yoke, and on which the arms are connected to a slide when moved from the extended position to the collapsed position; the arms having hooks at their outer ends adapted to engage the legs of an animal for hanging, and being adapted to be moved into a close, substantially contacting relationship in the collapsible position.

8 Claims, 5 Drawing Figures

U.S. Patent June 7, 1977 4,027,357
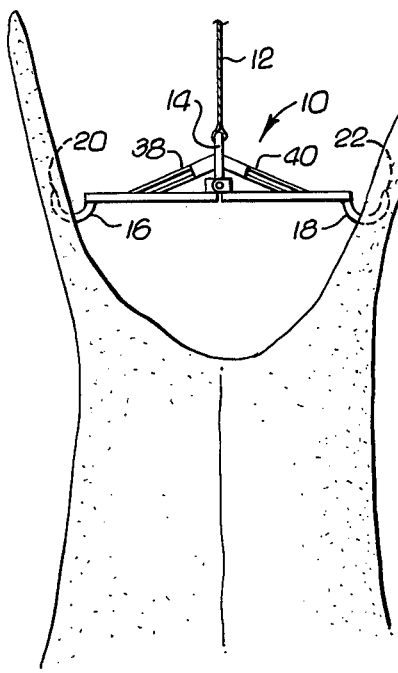
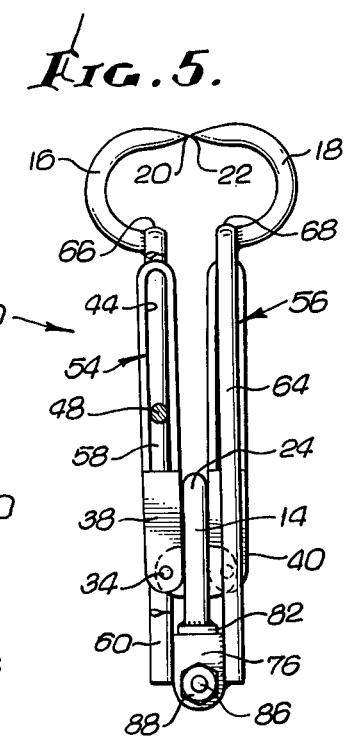
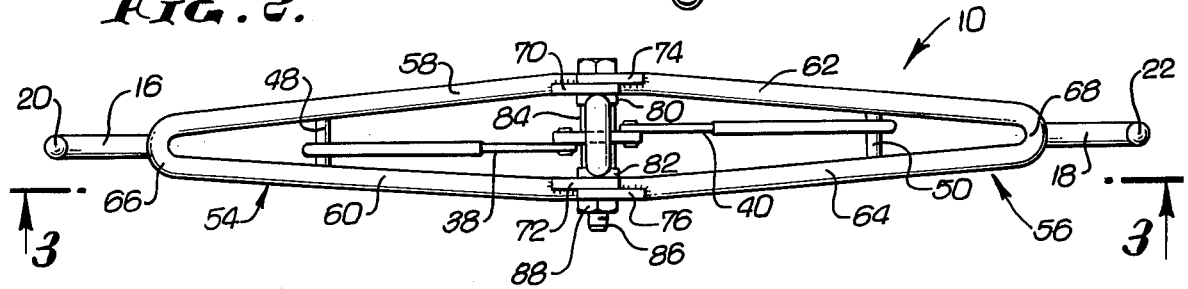
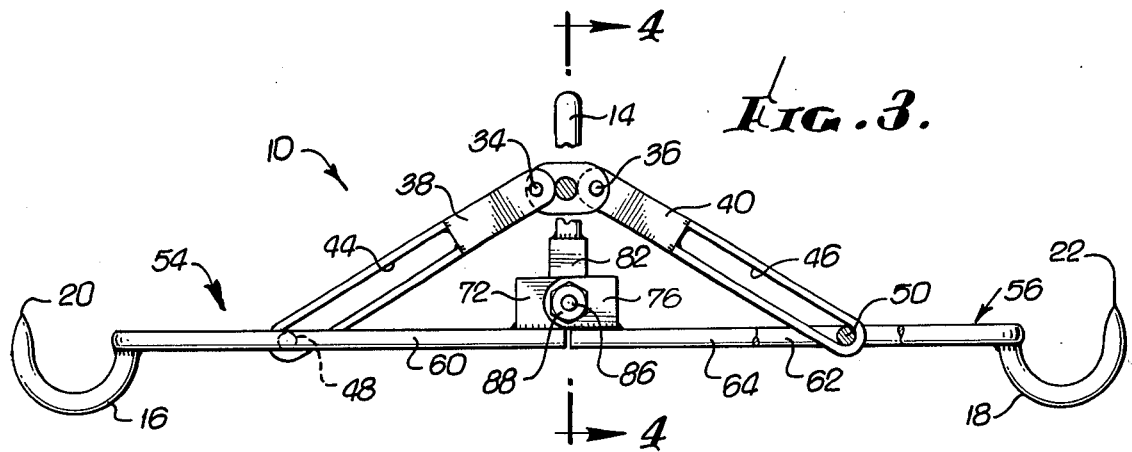

COLLAPSIBLE DRESSING HOOK FOR ANIMALS

BACKGROUND OF THE INVENTION

The invention relates to animal dressing hooks which in the prior art have been overly complicated, heavy and bulky. Such hooks may be used for hanging slaughtered domestic animals and killed game. They are particularly desirable for hanging game carcasses out of reach of other wild animals in the field, for draining, ageing, and for work on the body.

SUMMARY OF THE INVENTION

It is an object of the invention to provide an improved animal dressing hook.

It is another object of the invention to provide an animal dressing hook which is collapsible, compact, lightweight, and simple and inexpensive to manufacture.

It is still another object of the invention to provide an animal dressing hook, as described in the preceding paragraph, which is adapted to be supported from above by a block and tackle, for example, and which is adequate to support a deer or elk, for example.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is an elevational view of the invention shown in operating position supporting an animal, the support connection with the animal being by the impalement of the hook ends in the hind legs;

FIG. 2 is a plan view of the hook shown in the outwardly extended position, as illustrated n FIG. 1;

FIG. 3 is an enlarged, partly cutaway, elevational view of the hook in the extended position;

FIG. 4 is a partially cross-sectional view of the hook, taken along the lines 4—4 in FIG. 3; and FIG. 5 is a partly cutaway, elevational view of the hook in the collapsed position. de

DESCRIPTION OF THE PREFERRED EMBODIMENT

Referring again to the drawings, there is shown in FIG. 1 a collapsible dressing hook for animals, generally designated as 10, supported from the above by a rope or cable 12 secured to a U-shaped, centrally positioned yoke 14. At the outer ends of the device are impaling hooks 16 and 18 having their points 20 and 22 in supporting engagement with the hind legs of a four-legged animal, such as a deer.

In FIGS. 2-5, the dressing hook is illustrated in greater detail wherein the U-shaped yoke is shown to have its convex end 24 extending upwardly for supporting engagement. Two parallel legs 26 and 28 of the yoke extend from the U-shaped end, the legs having a fixed arm supporting pin 30 extending therebetween and perpendicular thereto. Fixed perpendicular to the pin 30 is a pivot support member 32.

Extending through opposite ends of the pivot member are pivot pins 34 and 36 which pivotally engage inner ends of arm supports 38 and 40. The outer ends of the arm supports have slots 44 and 46 engaged with pins 48 and 50, fixed to hook arms, gnerally designated as 54 and 56, respectively.

Each arm is formed of two members 58, 60 and 62, 64 which are spaced at their inner ends and joined at their outer ends 66 and 68, respectively, the respective hooks 20, 22 being shown to be welded to the outer ends. The inner ends of the arms have hinge-forming ears 70, 72 and 74, 76 welded thereto.

Welded to the lower ends of the yoke legs are yoke extensions 80 and 82. As shown in FIGS. 2 and 4, secured between the extensions is a sleeve 84, and through which extends an arm hinge bolt 86. The bolt 86 also extends through openings in the ears 74, 70, 72 and 76 so as to hingedly engage the arms at their inner ends to the yoke and its extensions. The bolt is secured in place by means of a nut 88.

The hook 10 is carried and packed in the collapsed or closed position, shown in FIG. 5, with the points 20 and 22 of the impaling hooks 16 and 20 in contact, or in substantial contact, and having the arms 54, 56 being coextensive. Similarly, the arm supports 38 and 40 are coextensive and substantially parallel in the collasped position.

In the open and supporting position the arms 54 and 56 extend outwardly in opposite directions from each other, being rotatable on the hinge bolt 86. The arms are supported in the open horizontal position by means of the arm supports 38 and 40, the pins 48 and 50 being engaged in the slots 44 and 46, respectively, the outer ends of the arm supports having their inner end surfaces being within the slots in supporting contact on the pins. As the arms are moved outwardly or to the collapsed position, the pins 48 and 50 slide within the slots 44 and 46.

In the extended position the arms are thus supported centrally by the hinge bolt 86 to the yoke, and intermediate their ends are supported by the yoke by means of the arm supports, connected at their inner and upper ends to the yoke. The ability of the arms to move on their hinge and the arm supports to be slidable with respect to the arms makes for easy engagement with the legs of an animal for hanging.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific form shown or uses mentioned except as defined in the accompanying claims, wherein various portions have been separated for clarity of reading and not for emphasis.

I claim:

1. A collapsible dressing hook for animals comprising:
   a member adapted to be engaged and supported to hang vertically from above,
   a pair of oppositely outwardly extending arms having inner and outer ends,
   the arms being hinged to said member adjacent their inner ends,
   said arms being adapted to be hingedly moved on said member from an outwardly extending position to a substantially vertical collapsed position, animal impaling hooks on the outer ends of said arms, and an arm support for each arm, each arm support having outer and inner ends, each arm support being pivotally connected adjacent its inner end to said member above the inner ends of said arms, each arm support being connected adjacent its outer end to a respective arm intermediate its ends to support the arm in the outwardly extending position, the connection of each arm support to the respective arm being slidable to permit the arms to move to their collapsed substantially vertical position from the extended position.

2. The invention according to claim 1 in which:
the hooks have ends which extend upwardly when the arms are in the outwardly extending position being at right angles to their collapsed position.
the hook ends extending toward each other in substantial contact when the arms are in the collapsed position.

3. The invention according to claim 2 in which:
said hooks are approximately semicicular and have points on their ends.

4. The invention according to claim 1 in which:
said member is a substantially U-shaped yoke, the convex portion of the U extending upwardly and being adapted to be engaged to be supported upwardly,
the legs of the U being spaced transversely with respect to the direction of the arms,
the arms in the collapsed position being closely adjacent and extending in the same direction as the U-legs.

5. The invention according to claim 4 in which:
a first fixed member extends transversely between the legs of the U of the yoke above said inner ends of the arms,
a second fixed member extending from said first fixed member on both sides thereof in the directions of said arms,
said arm supports being connected to said second fixed member.

6. The invention according to claim 5 in which:
the inner ends of the respective arms being in facing relationship when in the outwardly extending position.

7. The invention according to claim 1 in which:
the arms are formed of two spaced members having a pin extending therebetween, the spaced members being joined at their outer ends,
the pin in each arm being connected to the respective arm support.

8. The invention according to claim 7 in which:
said arm supports have elongated slots extending inwardly from adjacent their outer ends,
said pins in said arms extending through said slots, whereby when said arms are moved to their collapsed position, said pins slide within said slots.

* * * * *